United States Patent
Korus

(10) Patent No.: US 7,311,275 B2
(45) Date of Patent: Dec. 25, 2007

(54) WHEEL ASSEMBLY FOR IRRIGATION SYSTEM

(75) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 273 days.

(21) Appl. No.: 11/004,474

(22) Filed: Dec. 3, 2004

(65) Prior Publication Data

US 2006/0118662 A1   Jun. 8, 2006

(51) Int. Cl.
*B05M 3/00* (2006.01)
*B60K 17/34* (2006.01)

(52) U.S. Cl. ............... 239/735; 239/744; 239/722; 239/723; 239/726; 239/743; 239/728; 239/266; 239/732; 180/233

(58) Field of Classification Search ........... 239/722, 239/723, 726, 730, 735, 737, 742, 743, 744, 239/266; 180/2.1, 11, 12, 14.2, 15, 218, 180/21, 6.48, 6.5
See application file for complete search history.

(56) References Cited

U.S. PATENT DOCUMENTS

| | | | | |
|---|---|---|---|---|
| 3,631,884 A | * | 1/1972 | Von Linsowe | 239/732 |
| 3,662,776 A | * | 5/1972 | Bryant et al. | 239/728 |
| 4,704,851 A | * | 11/1987 | Manor | 56/340.1 |
| 6,039,273 A | * | 3/2000 | Christensen | 239/729 |
| 6,616,374 B2 | | 9/2003 | Starr | |
| 6,666,384 B2 | * | 12/2003 | Prandi | 239/1 |
| 6,755,362 B2 | * | 6/2004 | Krieger et al. | 239/731 |
| 6,755,363 B2 | * | 6/2004 | Weatherl et al. | 239/735 |
| 6,820,828 B1 | * | 11/2004 | Greenwalt | 239/726 |
| 6,889,922 B1 | * | 5/2005 | Knight et al. | 239/737 |
| 2006/0060665 A1 | | 3/2006 | Arthur et al. | |

FOREIGN PATENT DOCUMENTS

EP        387465 A1 *  9/1990

OTHER PUBLICATIONS

Starr Trak Brochure—"The Answer to Your Irrigation Challenges" (Front and Back).
Zimmatic Center Pivot Components Brochure (30-0049-0).
Lindsay Manufacturing "irrigation Systems Product Guide" (LMC2004-04) (22 pgs with Front and Back Cover).

* cited by examiner

*Primary Examiner*—Kevin Shaver
*Assistant Examiner*—James S. Hogan
(74) *Attorney, Agent, or Firm*—Hovey Williams LLP

(57) ABSTRACT

Mobile towers of an irrigation system have drive wheel assemblies that propel the towers along the ground. At least certain of the wheel assemblies may comprise dual wheels that share a common axis of rotation but are separately driven by their own drive motor. By driving the two separate wheels in unison but with their own individual drive shafts, increased ground-engaging surface area can be obtained without a consequential increase in load for any one motor.

14 Claims, 2 Drawing Sheets

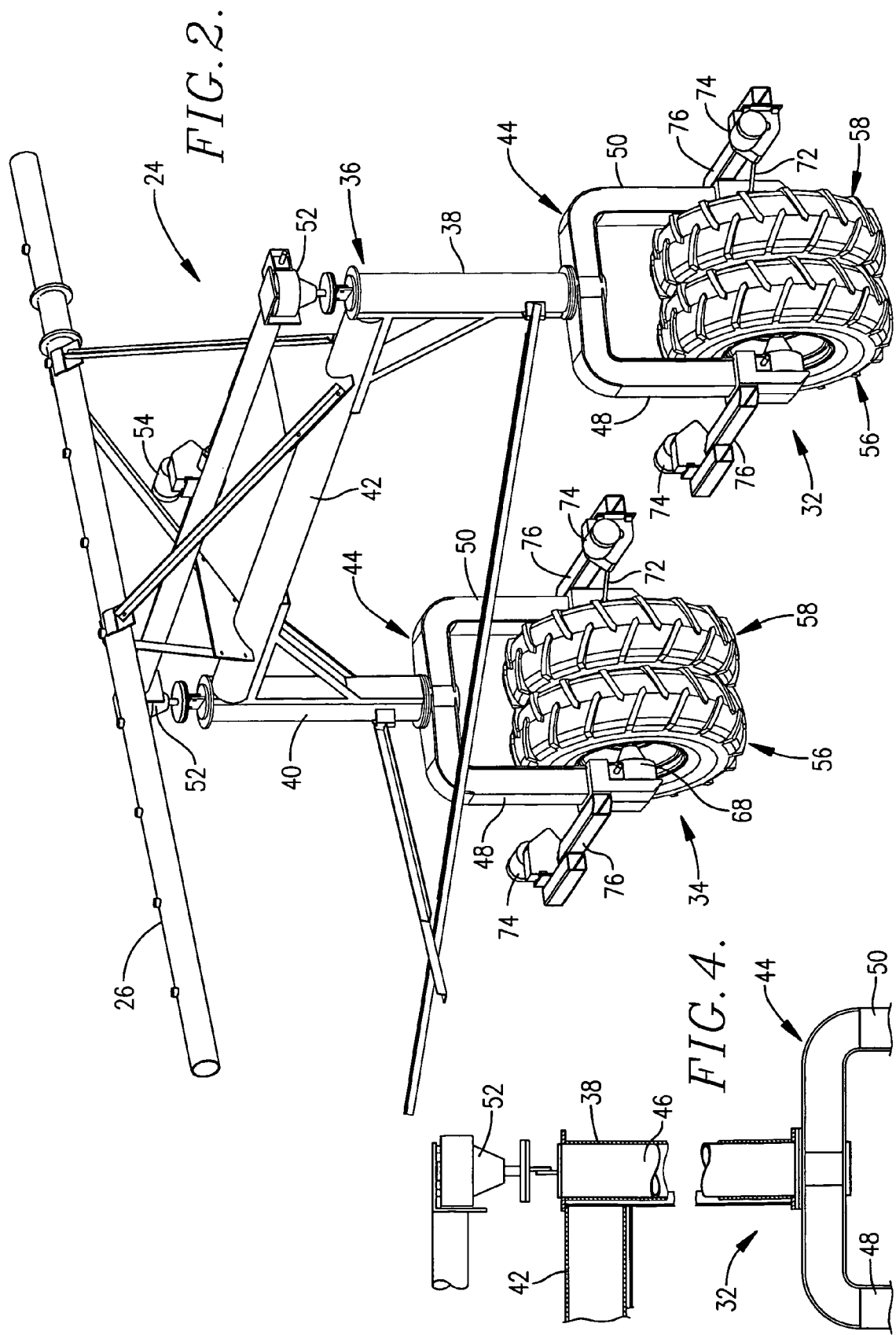

WHEEL ASSEMBLY FOR IRRIGATION SYSTEM

TECHNICAL FIELD

This invention relates to the field of agricultural irrigation systems and, more particularly, to an improved drive wheel assembly for the mobile towers of such systems.

BACKGROUND AND SUMMARY

It is known in the art to provide the mobile, water conduit-supporting towers of irrigation systems with drive wheels that propel the towers over ground to be irrigated. Typically, such towers include at least a pair of wheel assemblies at the base of the tower, each assembly comprising a single drive wheel powered by an electric or hydraulic motor.

It would be desirable in some instances to increase the ground-engaging surface area or "foot print" of each wheel assembly, such as where the wheel assemblies are steerable. However, providing larger tires or attaching special enlarged traction structures to the existing wheels necessarily increases the load on their existing drive motors and gearboxes, which can cause the units to malfunction or fail prematurely.

The present invention achieves the desired increase in surface area through the provision of a separately driven second wheel for each wheel assembly. Both wheels of each assembly are driven in unison and at the same speed but by separate drive motors. Preferably, the two wheels share a common axis of rotation but have separate drive shafts that are driven by separate motors. In one preferred form of the invention, the two wheels are disposed in closely spaced apart, side-by-side relationship. Preferably, the wheels are supported on a yoke having an upright, rotatable spindle and a pair of upright, laterally spaced legs that depend from the spindle at its lower end. The drive motors and gearboxes for the two wheels are duplicates of one another and are electrically interconnected.

BRIEF DESCRIPTION OF THE DRAWINGS

FIG. 2 is an enlarged, fragmentary isometric view of the steerable tower of the corner span in FIG. 1 illustrating in more detail the wheel assemblies of such tower;

FIG. 4 is a fragmentary, vertical cross-sectional view of a wheel assembly illustrating details of construction.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Although the principles of the present invention have utility with respect to a variety of irrigation systems, they are particularly beneficial when applied to systems wherein at least certain of the wheel assemblies are steerable. For example, steerable wheels are typically used on the auxiliary corner span of a center pivot system wherein the corner span is steered into difficult-to-reach corners of the field as the main span sweeps in a circular path around the primary portion of the field. One such system is disclosed in U.S. Pat. No. 5,695,129 owned by the assignee of the present invention and hereby incorporated by reference into the present specification. Accordingly, in the description which follows, the invention is disclosed by way of example in connection with steerable wheel assemblies and, in particular, the steerable wheel assemblies of the corner span of a center pivot irrigation system.

Figure 1:
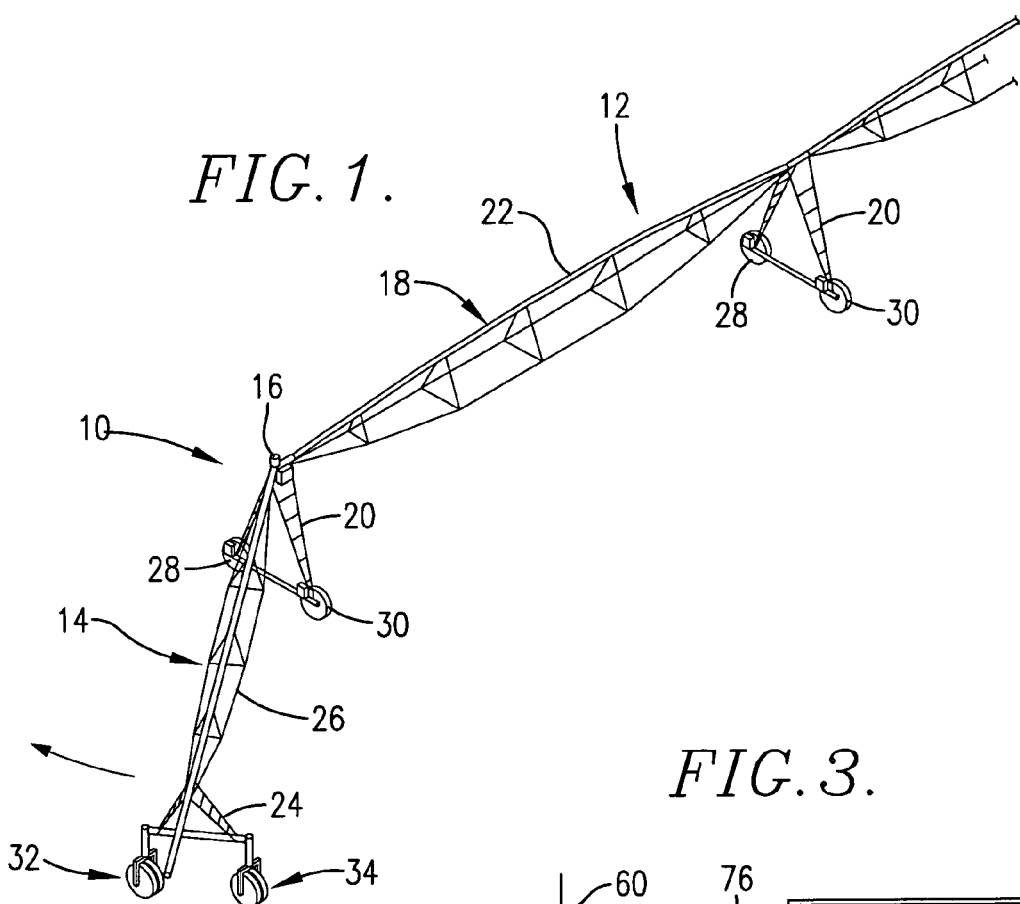
FIG. 1 is a fragmentary, schematic illustration of a center pivot irrigation system employing an auxiliary corner span, the steerable tower of the corner span employing wheel assemblies constructed in accordance with the principles of the present invention.

FIG. 1 illustrates a center pivot irrigation system 10 having a main span 12 and an auxiliary or corner span 14. Main span 12 is connected at its inner end to a central pivot (not shown), and corner span 14 has a pivotal connection 16 at its inner end with the outer end of main span 12. A water supply conduit 18 stretches along the main span 12 and corner span 14 for supplying water to a number of distribution heads (not shown). Main span 12 has non-steerable towers 20 supporting a main section 22 of conduit 18, while corner span 14 has a steerable tower 24 supporting a conduit section 26 that is hingedly interconnected with main section 22 at or adjacent pivot 16. Non-steerable towers 20 are each provided with single-wheel drive wheel assemblies 28 and 30, while steerable tower 24 is provided with dual-wheel drive wheel assemblies 32 and 34.

As illustrated in FIG. 2, steerable tower 24 comprises a somewhat generally H-shaped frame 36 having a pair of upright, tubular legs 38 and 40 that are interconnected across their upper ends by a cross pipe 42. Wheel assemblies 32, 34 are disposed at the lower ends of legs 38, 40. As illustrated in FIGS. 2 and 4, in one preferred embodiment each wheel assembly 32, 34 includes a yoke 44 comprising an upright spindle 46 and a pair of wheel supports in the form of laterally spaced, generally upright legs 48 and 50 fixed to the lower end of spindle 46. Spindles 46 are rotatably received within legs 38, 40 and at their upper ends are operably connected through gearboxes 52 in a well known manner to a common electric or hydraulic steering motor 54 that is operable to swivel spindles 46 about their upright axes in unison and in equal amounts so as to steer wheel assemblies 32 and 34.

Figure 3:
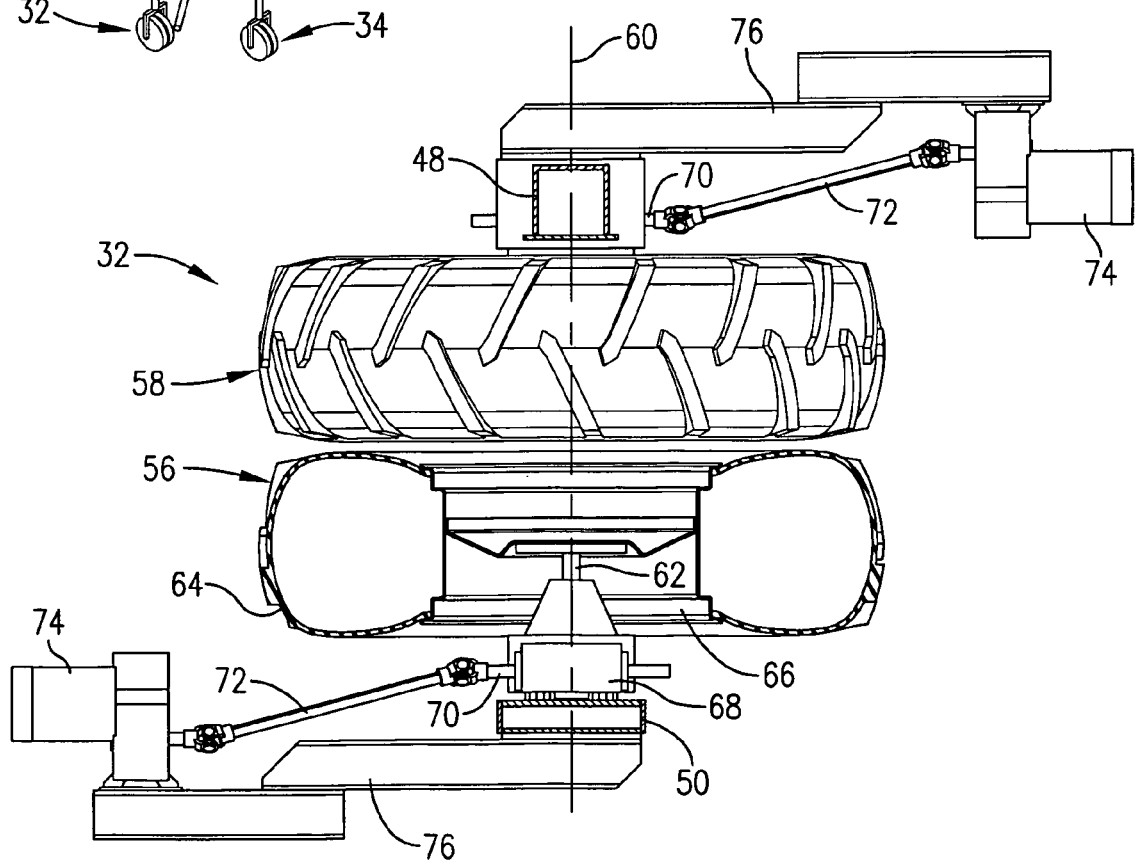
FIG. 3 is a horizontal cross-sectional view through one of the wheel assemblies taken at a location above the drive motors thereof and looking downwardly.

Referring also now to FIG. 3, it will be seen that each wheel assembly 32, 34 includes a set of dual wheels 56 and 58 supported by the yoke 44 of the wheel assembly. In one preferred embodiment, wheels 56, 58 are closely spaced apart in side-by-side relationship between the legs 38, 40. Wheels 56 and 58 are both rotatable about a common axis of rotation 60, but each has its own axle 62 that is mechanically separate from the axle of the other wheel. Thus, wheels 56 and 58 are not structurally fixed to one another as in the case of conventional dual wheels, but are instead capable of independent rotation relative to each other. As is conventional, each wheel 56, 58 may include a pneumatic tire 64 mounted on a hub 66 that is fixed to the end of axle 62 in a suitable manner, such as by lug bolts (not shown). The two axles 62 associated with each wheel assembly 32, 34 project laterally inwardly from their respective yoke legs 48, 50 toward one another and in axial alignment with each other.

Each axle 62 comprises the output shaft of a right angle gearbox 68 secured to the inside face of yoke leg 48 or 50 at its lower end. An input shaft 70 of gearbox 68 is operably coupled via a U-joint driveline 72 to a combined drive motor and gearbox unit 74 of conventional construction that is supported on a horizontally extending arm 76 projecting generally parallel with the path of travel of wheels 56, 58.

Although drive motors 74 for each wheel assembly 32, 34 are mechanically separate from one another and each drives its own wheel, drive motors 74 are electrically connected in such a manner that they operate simultaneously and at the same speed. Consequently, each motor 74 is burdened with the load of only one wheel 56 or 58, yet the effective ground-engaging wheel surface area obtained by each wheel assembly 32, 34 is double that provided by prior wheel assemblies having only a single wheel. Consequently, the benefits of dual drive wheels are obtained without the detriment of increased loading on any single drive motor.

It is to be noted that although drive motors 74 have been described as electric motors and connected in a circuit in such a manner that all motors 74 operate in unison, such motors may also comprise hydraulic motors that would be plumbed in such a manner that they too would operate in unison. It will be seen, therefore, that the principles of the present invention apply to hydraulic driving means as well as electric means, although electric means are the preferred embodiment.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In an irrigation system having at least one mobile tower supporting a water supply conduit for movement over a field, the improvement comprising:
   a pair of drive wheel assemblies at the lower end of said tower for propelling the tower
   each of said drive wheel assemblies including a pair of ground-engaging drive wheels and a pair of separate drive motors operably coupled with respective wheels of the assembly for driving the two wheels of each assembly simultaneously,
   each ground engaging drive wheel in a drive wheel assembly being disposed for movement along a different path of travel from that of the other drive wheel in the assembly.

2. In an irrigation system as claimed in claim 1, said drive wheels of each assembly being supported for rotation about a common horizontal axis.

3. In an irrigation system as claimed in claim 1, said mobile tower comprising a steerable tower of an auxiliary irrigation span that is movable relative to another span of the system, said wheel assemblies of the steerable tower being steerable.

4. In an irrigation system as claimed in claim 3, each of said wheel assemblies including an upright, rotatable spindle for steering the wheel assembly.

5. In an irrigation system as claimed in claim 4, the wheels of each assembly being closely spaced apart in side-by-side relationship.

6. In an irrigation system as claimed in claim 4, each of said wheel assemblies further including a pair of wheel supports projecting generally laterally outwardly from the lower end of said spindle, one of said wheels being mounted on each of said supports.

7. In an irrigation system as claimed in claim 4 said spindle comprising part of a yoke for supporting the wheels of each wheel assembly, said yoke further including a pair of legs fixed to and projecting generally downwardly from a lower end of the spindle, each of said legs supporting one of said drive wheels.

8. In an irrigation system as claimed in claim 7, said wheels of each yoke being disposed between the legs of the yoke in closely spaced, side-by-side relationship.

9. In an irrigation system as claimed in claim 7, said legs supporting a pair of separate, aligned drive shafts projecting inwardly toward one another from respective ones of the legs, each of said drive shafts being operably coupled with a respective one of said drive motors and secured to a respective one of said drive wheels.

10. In an irrigation system as claimed in claim 1, each of said wheel assemblies including a pair of laterally spaced, upright legs, each of said legs supporting one of said drive wheels.

11. In an irrigation system as claimed in claim 10, said legs supporting a pair of separate, aligned drive shafts projecting inwardly toward one another from respective ones of the legs, each of said drive shafts being operably coupled with a respective one of said drive motors and secured to a respective one of said drive wheels.

12. In an irrigation system as claimed in claim 11, said legs of each wheel assembly comprising part of a yoke having an upright spindle fixed to upper ends of the legs, said spindle being rotatable about its upright axis to render the wheel assemblies and the mobile tower steerable.

13. In an irrigation system as claimed in claim 1, said wheels of each wheel assembly being disposed in closely spaced, side-by-side relationship.

14. In an irrigation system as claimed in claim 1, said mobile tower comprising a steerable tower of a corner irrigation span that is pivotally connected to a main span, the wheel assemblies of the corner span being steerable and the wheel assemblies of the main span being non-steerable.

* * * * *